(12) United States Patent
Hoshino et al.

(10) Patent No.: US 7,827,879 B2
(45) Date of Patent: Nov. 9, 2010

(54) WEBBED SPIRAL BEVEL GEAR

(75) Inventors: Akinori Hoshino, Nisshin (JP); Haruji Suzuki, Kariya (JP); Shusaku Kamio, Nishio (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 398 days.

(21) Appl. No.: 11/943,970

(22) Filed: Nov. 21, 2007

(65) Prior Publication Data

US 2008/0121061 A1 May 29, 2008

(30) Foreign Application Priority Data

Nov. 28, 2006 (JP) .............................. 2006-319420

(51) Int. Cl.
*F16H 55/17* (2006.01)
*F16H 1/14* (2006.01)
*F16H 1/20* (2006.01)
*F16H 1/18* (2006.01)

(52) U.S. Cl. .................. 74/459.5; 74/420; 74/424.5

(58) Field of Classification Search .................. 74/420, 74/422, 423, 424.5, 459.5; 29/893, 893.3, 29/893.35; 409/13

See application file for complete search history.

(56) References Cited

U.S. PATENT DOCUMENTS

| 1,647,157 | A | * | 11/1927 | Nikola .................. 74/459.5 |
| 3,605,518 | A | * | 9/1971 | Haller .................. 74/459.5 |
| 4,308,760 | A | * | 1/1982 | Voigtlander et al. ........ 74/459.5 |
| 5,528,952 | A | * | 6/1996 | Takita et al. .............. 74/459.5 |

FOREIGN PATENT DOCUMENTS

| JP | 5-231497 A | 9/1993 |
| JP | 2001-205385 A | 7/2001 |

* cited by examiner

*Primary Examiner*—Thomas R Hannon
*Assistant Examiner*—Justin Krause
(74) *Attorney, Agent, or Firm*—Buchanan Ingersoll & Rooney PC

(57) ABSTRACT

A webbed spiral bevel gear formed by cold forging includes: gear teeth formed at a peripheral surface of the gear basis to be integral therewith. Each gear tooth includes a tooth top land and a tooth bottom land both in a slanting and curved manner relative to a center axis of the gear basis. The webbed spiral bevel gear includes a web portion formed at radially outer end portions of the gear teeth to be integral therewith and closing the tooth bottom lands at the radially outer end portions of the gear teeth. The web portion is continuous with the radially outer end portions of the tooth top lands. A profile of the radially outer end portion of the tooth top land of each gear tooth has two edges extending at a slant from each other and expanding in a direction of the web portion.

1 Claim, 3 Drawing Sheets

Radially outer end

WEBBED SPIRAL BEVEL GEAR

CROSS REFERENCE TO RELATED APPLICATIONS

This application is based on and claims priority under 35 U.S.C. §119 to Japanese Patent Application 2006-319420, filed on Nov. 28, 2006, the entire content of which is incorporated herein by reference.

FIELD OF THE INVENTION

The present invention generally relates to a webbed spiral bevel gear formed by cold forging.

BACKGROUND

Conventionally, a webbed spiral bevel gear is employed for a driving force transmitting member such as a differential gear unit for an automobile, which webbed spiral bevel gear exhibits a high gear strength and causes a small transmitting noise when operating at a high-speed rotational level. JP2001-205385A discloses a method for manufacturing a webbed bevel gear by cold forging.

FIGS. 4 and 5 illustrate a conventional webbed spiral bevel gear 21 formed by cold forging. The webbed spiral bevel gear 21 includes a gear basis 22 and gear teeth 25 each including a tooth top land 23 and a tooth bottom land 34. In each gear tooth 25, the tooth top land 23 and the tooth bottom land 34 are both formed integrally at a peripheral surface of the gear basis 22 and extend slantingly and curvedly relative to a center axis of the gear basis 22. The webbed spiral bevel gear 21 further includes a web portion 26 formed with a radially outer end portion of each gear tooth 25 to be integral therewith and closing the tooth bottom land 34 at the radially outer end portion of each gear tooth 25.

However, as illustrated in FIG. 5 (enlarged diagram of portion "B" of FIG. 4), in the conventional webbed spiral bevel gear 21 formed by cold forging, a cross-section c-c is taken along a direction perpendicular with the center axis 34 of the gear basis 22 from the gear tooth 25 to the web portion 26. As illustrated by the cross-section c-c, a profile of the radially outer end portion of each gear tooth 25, which is continuous with the web portion 26, rapidly expands at the web portion 26 in a direction from the radially outer end of the gear tooth 25 to the web portion 26. Accordingly, at the time when the gear is formed, smooth flow of gear material in a mold (not illustrated) is difficult. Therefore, a large forming load is required for processing. Increase of the forming load causes a shorter mold lifetime and causes an increase in processing cost.

Further, when the forming load increases, forcible tensile stress and compressive stress are applied to the gear material. Accordingly, reproduction accuracy for the material worsens, which causes a decrease of processing precision. The decrease of the processing precision causes necessity of post-processing (cutting, or the like) or a gear noise (transmitting noise), or the like.

Further, in a structure of the webbed spiral bevel gear 21, an acute angle side and an obtuse angle side are provided between each gear tooth 25 and the web portion 26. When the webbed spiral bevel gear 21 is utilized as a transmission component, a concentration of stress between the gear tooth 25 and the web portion 26 at the acute angle side may occur, causing a decrease of gear strength.

A need thus exists for a webbed spiral bevel gear, which is not susceptible to the drawback mentioned above.

SUMMARY OF THE INVENTION

According to an aspect of the present invention, a webbed spiral bevel gear formed by cold forging includes: a gear basis; and gear teeth formed at a peripheral surface of the gear basis to be integral therewith. Each gear tooth includes a tooth top land and a tooth bottom land both in a slanting and curved manner relative to a center axis of the gear basis. The webbed spiral bevel gear further includes a web portion formed at radially outer end portions of the gear teeth to be integral therewith and closing the tooth bottom lands at the radially outer end portions of the gear teeth. The web portion is continuous with the radially outer end portions of the tooth top lands. As a result, a profile of the radially outer end portion of the tooth top land of each gear tooth has two edges extending at a slant from each other and expanding in a direction of the web portion.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

A webbed spiral bevel gear manufactured by cold forging according to embodiments of the present invention will be explained with reference to drawing figures.

Figure 1:
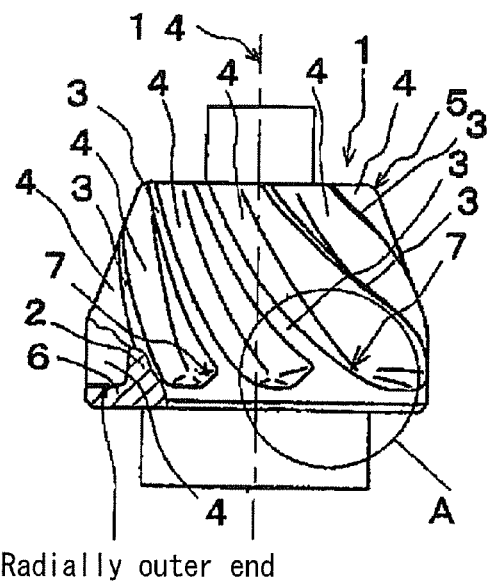
FIG. 1 represents a side view illustrating a webbed spiral bevel gear according to a first embodiment of the present invention.

FIG. 1 represents a side view illustrating a webbed spiral bevel gear 1 according to a first embodiment of the present invention. The webbed spiral bevel gear 1 manufactured by cold forging includes a gear basis 2, and gear teeth 5 formed at a peripheral surface of the gear basis 2 to be integral therewith. Each gear tooth 5 includes a tooth top land 3 and a tooth bottom land 4 generally described as the bottom of the groove or valley formed between a corresponding adjacent gear tooth 5. The tooth top land 3 and the tooth bottom land 4 both extend in a slanting and curved manner relative to a center axis 14 of the gear basis 2. The webbed spiral bevel gear 1 further includes a web portion 6 formed at radially outer end portions of the gear teeth 5 to be integral therewith and closing the tooth bottom lands 4 at the radially outer end portions of the gear teeth 5. In this case, the tooth top lands 3 of the webbed spiral bevel gear 1 are continuous with the web portion 6. The webbed spiral bevel gear 1 still further includes double-sided portions 7 extending from the respective radially outer ends of the gear teeth 5 to the web portion 6. Each double-sided portion 7 defines a profile of the radially outer end portion of the tooth top land 3 of the corresponding gear tooth 5 and opens towards the web portion 6. The two edges forming the double-sided portion 7 extend not in parallel to each other but at a slant from each other, so that the double-sided portion 7 exhibits a reverse V-shaped structure without a bottom, which openly expands in a direction of the web portion 6.

Figure 2:
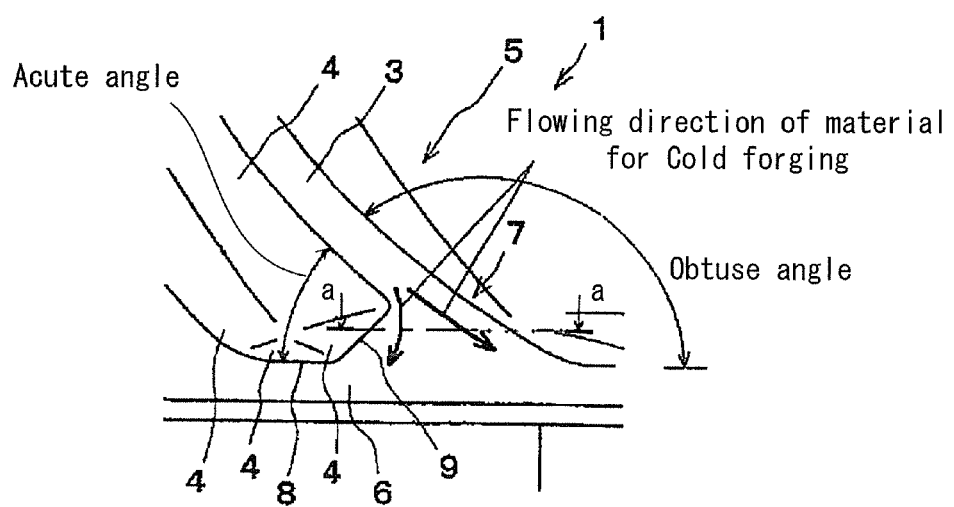
FIG. 2 represents an enlarged view of portion "A" of FIG. 1 illustrating the webbed spiral bevel gear according to the first embodiment of the present invention.

FIG. 2 represents an enlarged, diagram of portion "A" of FIG. 1 illustrating the first embodiment of the present invention. As is obvious from FIG. 2, a reference numeral 8 generally depicts a first linear portion for each gear tooth 5, which is formed at a periphery of the web portion 6 closing the corresponding tooth bottom land 4 and extends in a direction perpendicular (right and left directions in FIGS. 1 and 2) relative to the center axis 14. A reference numeral 9 generally depicts a second linear portion (one of the edges) for each gear tooth 5, which forms the double-sided portion 7. As for each gear tooth 5, the first linear portion 8 is continuous with the second linear portion 9. The second linear portion 9 is provided at the side of an acute angle defined between the tooth top land 3 of the gear tooth 5 and the web portion 6. Here, the second linear portion 9 serves as one of the two edges forming the double-sided portion 7 defining the profile of the radially outer end portion of the tooth top land 3.

In the webbed spiral bevel gear 1 according to the first embodiment, the profile of the radially outer end portion of the tooth top land 3 of the gear tooth 5 continuous with the web portion 6 exhibits the reverse V shape without a bottom and openly expands towards the web portion 6. Therefore, a cross-section a-a taken along a direction perpendicular with the center axis 14 of the gear basis 2 gradually expands in a direction from the radially outer end portions of the gear teeth 5 to the web portion 6. Accordingly, at the time of cold forging processing, a gear material smoothly flows in a mold (not illustrated) from the gear teeth 5 to the web portion 6. Therefore, forming load required upon cold forging processing is reduced, a mold lifetime is extended (for example, the number of formable products increases from ten thousand units to a hundred thousand units) and processing cost is reduced. Further, because of the smooth flow of the gear material, high reproduction accuracy is obtained. Further, processing precision is improved, post-processing (cutting, or the like) becomes unnecessary, and gear noise (transmitting noise), or the like, does not occur or may become less. Further, because concentration of stress between the gear tooth 5 and the web portion 6 at the acute angle side is reduced, gear strength higher than that of a conventional one is obtained.

Figure 3:
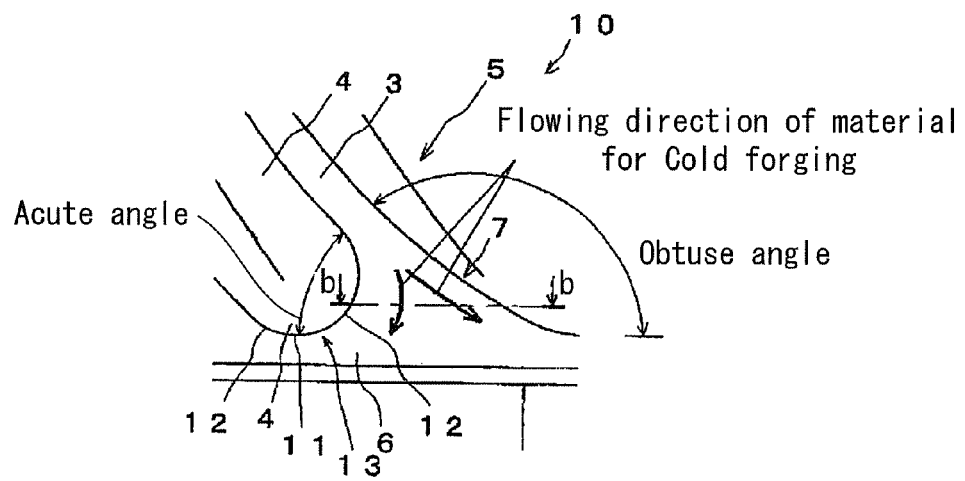
FIG. 3 represents an enlarged view corresponding to portion "A" of FIG. 1 illustrating a webbed spiral bevel gear according to a second embodiment of the present invention.
Figure 4:
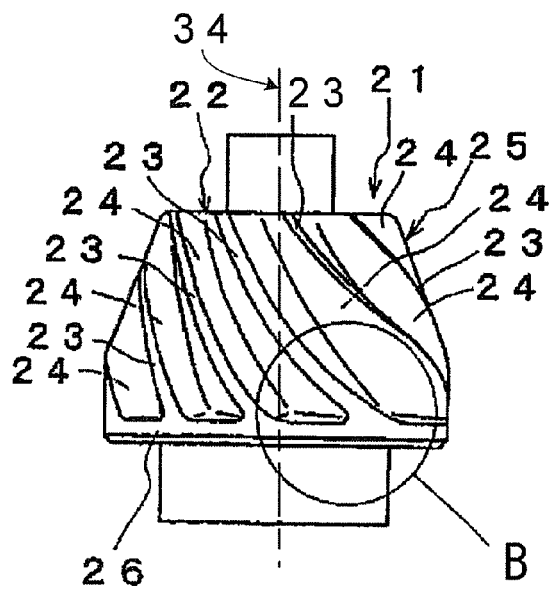
FIG. 4 represents a side view illustrating a conventional webbed spiral bevel gear.
Figure 5:
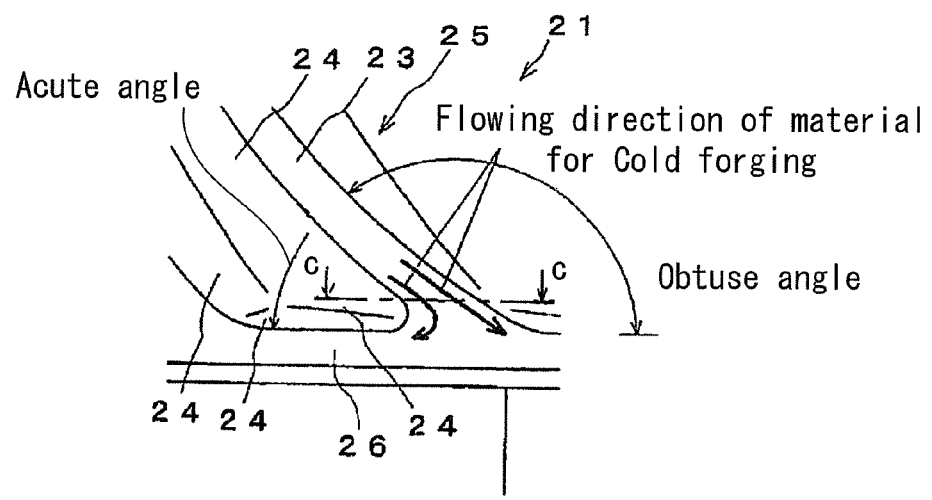
FIG. 5 represents an enlarged view of portion "B" of FIG. 4 illustrating the conventional webbed spiral bevel gear.

FIG. 3 represents an enlarged diagram corresponding to the portion "A" of FIG. 1 and illustrates a webbed spiral bevel gear 10 according to a second embodiment of the present invention. Portions identical to those in the first embodiment will be explained with use of the same reference numerals. In the webbed spiral bevel gear 10 according to the second embodiment, a reference numeral 11 generally depicts a first curved portion for each gear tooth 5, which is formed at an outer periphery of the web portion 6 closing the tooth bottom land 4 at the radially outer end of the gear tooth 5. A reference numeral 12 generally depicts a second curved portion (one of the two edges) of each gear tooth 5, which forms the double-sided portion 7. The first curved portion 11 and the second curved portion 12 are continuous with each other and form a continuous curve 13. The second curved portion 12 is provided at the side of an acute angle defined between the tooth top land 3 of the gear tooth 5 and the web portion 6. The second curved portion 12 can also be provided at each of the acute angle side, and an obtuse angle side, between the tooth top land 3 of the gear teeth 5 and the web portion 6. In this case, the second curved portions 12 serve as the two edges forming the double-sided portion 7 defining the profile of the radially outer end portion of the tooth top land 3.

As same as in the first embodiment, in the webbed spiral bevel gear 10 according to the second embodiment, a cross-section, b-b taken along a direction perpendicular with the center axis 14 of the gear basis 2 gradually expands in a direction from the radially outer ends of the gear teeth 5 to the web portion 6. Accordingly, at the time of cold forging processing, gear material smoothly flows in a mold (not illustrated) from the gear teeth 5 to the web portion 6. Therefore, forming load required upon cold forging processing is reduced, a mold lifetime is extended and processing cost is reduced. Further, because of the smooth flow of the gear material, high reproduction accuracy is obtained. Further, processing precision is improved, post-processing (cutting, or the like) becomes unnecessary, and gear noise (transmitting noise), or the like, does not occur or may become less. Further, because concentration of stress between the gear tooth 5 and the web portion 6 at the acute angle side is reduced, gear strength higher than that of a conventional one is obtained.

Further, according to the second embodiment, each gear tooth 5 and the web portion 6 are connected by the corresponding continuous curved line 13. Therefore, in comparison with the webbed spiral bevel gear 1 of the first embodiment, in which a corner portion is formed at a portion continuous with the first linear portion 8 or the second linear portion 9, concentration of stress is furthermore reduced.

As described above, according to the embodiments of the present invention, the profile of the radially outer end portion of the tooth top land 3 of each gear tooth 5 has two edges 9, 90 or 12, 120 extending at a slant from each other and expanding in a direction of the web portion 6. Accordingly, a cross-section a-a or b-b of the tooth top land 3 of the gear tooth 5 continuous with the web portion 6 in a direction perpendicular to the center axis 14 of the gear basis 2 gradually expands from the outer end portion of the gear tooth 5 to the web portion 6. Therefore, at the time of cold forging processing, gear material smoothly flows in a mold from the gear teeth 5 to the web portion 6. Therefore, forming load can be reduced. Because of the reduction of the forming load in cold forging, a mold lifetime can be extended. Accordingly, processing cost can be reduced. Further, because of the smooth flow of the gear material, high reproduction accuracy can be obtained. Accordingly, processing precision can be improved, post-processing (cutting, or the like) becomes unnecessary, and gear noise (transmitting noise), or the like, can be prevented. Further, because concentration of stress at the acute angle side between the gear teeth 5 and the web portion 6 is relaxed, gear strength higher than that of a conventional one can be obtained.

The webbed spiral bevel gear 1 further includes a first linear portion 8 formed at a radially inner periphery of the web portion 6 and closing the tooth bottom land 4 at the radially outer end portion of the gear tooth 5, the first linear portion 8 extending in a direction perpendicular relative to the center axis 14 of the gear basis 2; and a second linear portion 9 being at least one of two edges of the profile of the radially outer end portion of the tooth top land 3 of each gear tooth 5 and continuous with the first linear portion 8.

Accordingly, as aforementioned, at the time of cold forging processing, the gear material smoothly flows in the mold from the gear teeth 5 to the web portion 6. Therefore, forming load can be reduced. Because of the reduction of the forming load in cold forging, a mold lifetime can be extended. Accordingly, processing cost can be reduced. Further, because of the smooth flow of the gear material, high reproduction accuracy can be obtained. Therefore, processing precision can be improved, post-processing (cutting, or the like) becomes unnecessary, and gear noise (transmitting noise), or the like, can be prevented. Further, concentration of stress at the side of the acute angle defined between the gear teeth 5 and the web portion 6 is relaxed. Accordingly, gear strength higher than that of a conventional one can be obtained.

Further, the second linear portion is provided at a side of an acute angle defined between the tooth top land 3 of the gear tooth 5 and the web portion 6.

Accordingly, when the spiral bevel gear 1 having the web is utilized as a transmission component, or the like, concentration of stress between the acute angle side between the gear teeth 5 and the web portion 6 can be relaxed. Therefore, gear strength higher than that of a conventional one can be obtained.

Meanwhile, the webbed spiral bevel gear can further includes: a first curved portion 11 formed at a radially inner periphery of the web portion 6 and closing the tooth, bottom land 4 at the radially outer end portion of the gear tooth 5, and a second curved portion 12 being at least one of two edges of the profile of the radially outer end portion of the tooth top land 3 of each gear tooth 5 and continuous with the first curved portion 11 so that a continuous curved line is formed from the first and second curved portions 11 and 12.

Accordingly, at the time of cold forging processing, the gear material smoothly flows in the mold from the gear teeth 5 to the web portion 6. Therefore, forming load can be reduced. Because of the reduction of the forming load in cold forging, a mold lifetime can be extended. Accordingly, processing cost can be reduced. Further, because of the smooth flow of the gear material, high reproduction accuracy can be obtained. Accordingly, processing accuracy can be improved, post-processing (cutting, or the like) becomes unnecessary, and gear noise (transmitting noise) can be prevented. Further, concentration of stress at the acute angle side between the gear teeth 5 and the web portion 6 is relaxed. Accordingly, gear strength higher than that of a conventional one can be obtained.

Further, because the gear teeth 5 and the web portion 6 are connected by the continuous curved line 13, concentration of stress can be further relaxed in comparison with the spiral bevel gear 1 having the web according to the second and third aspects of the present invention, in which a corner portion is formed at a portion contiguous with a linear portion.

The second curved portion is provided at a side of an acute angle defined between the tooth top land of the gear tooth and the web portion.

Accordingly, as same as in the third aspect of the present invention, concentration of stress at the acute angle side between the gear teeth 5 and the web portion 6, which tends to occur in a structure of the spiral bevel gear having the web, can be relaxed. Accordingly, gear strength can be improved.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A webbed spiral bevel gear formed by cold forging, comprising:
   a gear basis;
   gear teeth formed at a peripheral surface of the gear basis to be integral therewith, each gear tooth including a tooth top land and a tooth bottom land which both extend in a slanting and curved manner relative to a center axis of the gear basis;
   a web portion formed at radially outer end portions of the gear teeth to be integral therewith and closing the tooth bottom lands at the radially outer end portions of the gear teeth, the web portion being continuous with the radially outer end portions of the tooth top lands, whereby a profile of the radially outer end portion of the tooth top land of each gear tooth having two edges extending at a slant from each other and expanding in a direction of the web portion;
   a first linear portion formed at a radially inner periphery of the web portion and closing the tooth bottom land at the radially outer end portion of the gear tooth, the first linear portion extending in a direction perpendicular relative to the center axis of the gear basis; and
   a second linear portion being at least one of two edges of the profile of the radially outer end portion of the tooth top land of each gear tooth and continuous with the first linear portion; and
   wherein the second linear portion is provided at a side of an acute angle defined between the tooth top land of the gear tooth and the web portion.

* * * * *